Sept. 8, 1959  L. S. MAGOR  2,903,233
SPOOL VALVE ADJUSTMENT
Filed Feb. 26, 1958

INVENTOR
LINCOLN S. MAGOR
BY: Maybee & Legris
ATTORNEYS

United States Patent Office 2,903,233
Patented Sept. 8, 1959

2,903,233

SPOOL VALVE ADJUSTMENT

Lincoln S. Magor, Galt, Ontario, Canada, assignor to Retor Developments Limited, Galt, Ontario, Canada, a corporation Application February 26, 1958, Serial No. 717,720

4 Claims. (Cl. 251—3)

This invention relates to hydraulic valves and, in particular, to the hydraulic valve of the "spool type."

Hydraulic valves of the spool type generally comprise a cylindrical body having a spool valve element slidable axially within the bore of the body, axial movement of the spool causing variations in the volumetric flow of fluid through the valve and, in some positions, completely stopping the flow of fluid through the valve.

In such cases it is frequently desirable to have both a fine and a coarse adjustment for the axial position of the spool within the valve body and an object of the present invention is to provide such a fine and coarse adjustment mechanism.

Figure 1:
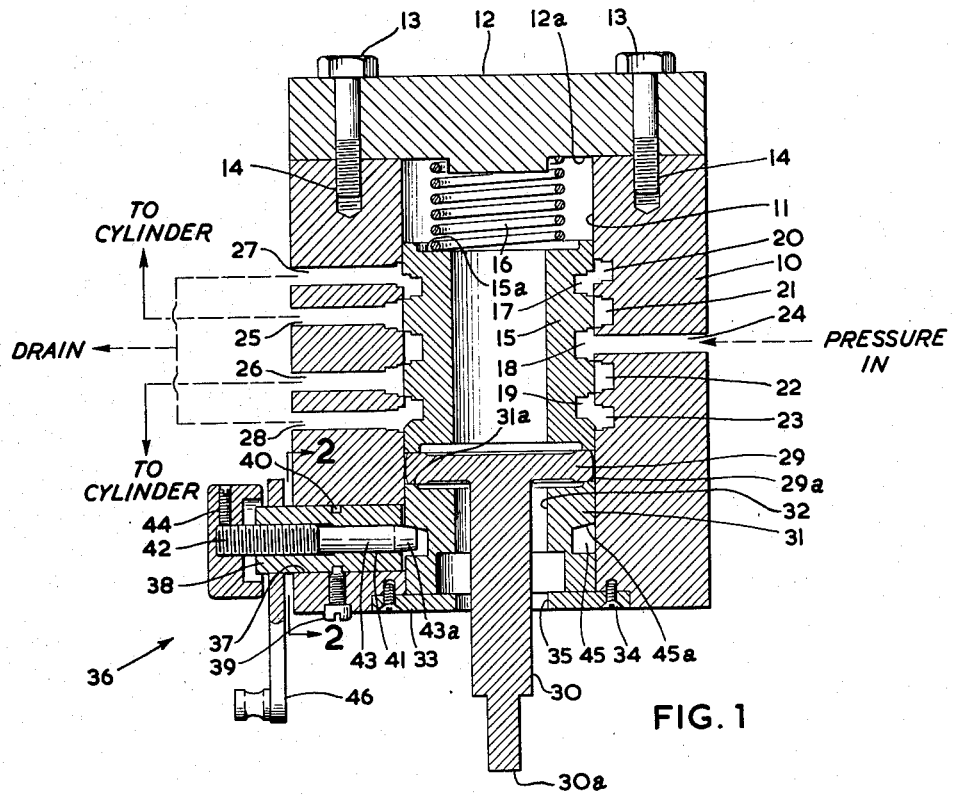
Figure 2:
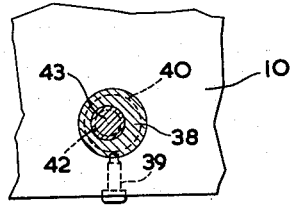

One preferred embodiment of the invention is illustrated in the accompanying drawing in which:

Figure 1 is an axial section of a spool type valve embodying the present invention, and Figure 2 is a section taken along line 2—2 of Figure 1.

Referring to Figure 1 it will be seen that the spool valve comprises generally a valve body 10 which is provided with an internal cylindrical bore 11 closed at one end by an end plate 12 secured in position by means of bolts 13 threadably engaged in holes 14 in the valve body 10.

Lying within the bore 11 of the body 10 is a spool valve element 15 which is a sliding fit within the bore 11 and which is urged in one direction along the bore 11 by means of a compression coil spring 16 bearing, at one end, against the inner wall 12a of the end wall 12 and, at the other end, against the end 15a of the valve spool 15.

The spool element 15 is provided with three annular grooves, 17, 18 and 19, cut therein and spaced axially along the external surface of the spool. Internal annular grooves 20, 21, 22 and 23 are cut in the internal surface of the bore 11 in the valve body 10 and are so arranged and spaced that during axial movement of the spool 15 within the bore 11, the grooves in the spool co-operate with grooves in the body to produce the desired flow patterns in a manner which is well known in the art.

An inlet port 24 is provided in the wall of the valve body through which fluid under pressure may enter the valve and groove 21 is connected to an outlet port 25 while groove 22 is connected to an outlet port 26. Grooves 20 and 23 are connected to ports 27 and 28 which lead, through suitable lines, back to the supply of fluid flowing through the valve.

Positioned in the bore 11 of the valve body 10 is a swash plate 29 having its peripheral edge 29a machined to a spherical radius so that it may occupy any angular position relative to the longitudinal axis of the bore 11 within the bore. Secured to that face of the swash plate 29 remote from the valve spool 15 is a stylus 30, the end 30a of which is adapted to contact a template. As a result, it may be seen that any displacement of the stylus 30 will cause a corresponding axial displacement of the valve spool 15 with the consequent variations in the flow pattern through the valve.

A stop member 31 in the form of a cylindrical member also slidable in the bore 11 and having a central bore 32 is provided surrounding the stylus 30 and bearing, at its upper end 31a against the face of the swash plate 29 from which the stylus 30 extends. Lying across the open end of the bore 11 is a plate 33 which is held in position by means of bolts 34. A central aperture 35 is also provided in this plate for the stylus 30.

As a result of the construction just described it will be observed that the spring 16 will normally urge the valve spool 15 into direct contact with the swash plate 29 which, in turn, will be urged into direct contact with the stop member 31 which, in its turn, is held from further axial movement by means of the adjusting mechanism indicated generally by the reference character 36. A space is left between the adjacent surfaces of the stop member 31 and the plate 33 so that the valve spool 15 is free to move in either axial direction, from the position shown in Figure 1.

In the position occupied by the component parts of the valve shown in Figure 1, there will be no flow of fluid through the valve since the fluid under pressure entering through port 24 can only enter the annular groove 18 in the valve spool from which it finds no exit due to the fact that the shoulders of the groove 18 are in direct contact with the adjacent shoulders of grooves 21 and 22. As a result, the valve is in the "at rest" position.

Under normal conditions, however, it will be desirable to provide a slight flow of fluid through the valve in one direction when the stylus 30 is not in contact with a template and, hence, is not exerting an axial force on the valve spool 15. For this purpose the adjusting mechanism 36 is provided which will permit coarse and fine adjustment of the stop member 31 to be achieved within extremely fine limits.

The construction of the adjusting mechanism 36 can be seen from Figure 1 to comprise firstly, a drilling 37 in the wall of the body 10 within which is mounted a bushing 38 which is rotatable within the drilling 37 and held in position therein by means of a grub screw 39 which engages an annular groove 40 cut in the external surface of the bushing 38.

The bushing 38 is provided with a drilling 41 therein, the drilling having an axis which is parallel to but spaced from the axis of the bushing and provided with internal threads to engage external threads 42 on the surface of a pin 43 which passes through the drilling 41 in the bushing 38. A knurled knob 44 is secured to the end of the pin 43 for facilitating its rotation within the bushing 38.

The end 43a of the pin 43 extends into the bore 11 of the body 10 and into an annular groove 45 cut in the external surface of the stop member 31 and the side face of the end 43a of the pin 43 bears against one side of the groove 45 in the stop member 31 to restrain it from axial movement under the influence of the spring 16.

As can be seen from Figure 1, the end 43a of the pin 43 is provided with a taper and from this drawing it may be seen that by advancing the pin 43 into the bore 11 of the body 10, a cam action will be exerted by the tapered end of the pin 43 on the edge 45a of the groove 45 so that advancing the pin 43 into the bore 11 of the body 10 will cause the stop member 31 to move towards the spring 16 and, conversely, retracting the pin 43 from the bore 11 will permit the stop member 31 to move axially of the bore 11 under the influence of the spring bias.

The sides of groove 45, or at least side 45a adjacent the spring 16 is formed with a taper complementary to the taper on the end of pin 43 so that there is a line contact between the end 43a of pin 43 and side 45a of groove 45.

The operation of the pin 43 so far described constitutes the fine adjustment of the valve spool 15. The coarse adjustment of the valve spool 15 is provided by the eccentricity of the hole 41 within the bushing 38. The bushing 38, as seen in Figure 1, is provided with a handle 46 secured thereto by any suitable means such as brazing, a grub screw or a pair of co-operating surfaces which are non-circular, so that the handle 46 may be grasped to rotate the bushing 38 within the drilling 37 in the body 10. Due to the eccentricity between the axis of the pin 43 and the axis of the bushing 38, rotation of the bushing 38 within its drilling will cause the pin 43 to be moved bodily axially of the bore 11 in the body 10. The degree of eccentricity between the axis of the pin 43 and the axis of the bushing 38 is such that a relatively coarse adjustment can be achieved, the bodily movement of the pin 43 axially of the bore 11, either causing or permitting the axial movement of the stop member 31 either against a spring 16 or with it.

In an embodiment of the present invention currently being manufactured by the assignee of the applicant, the end 43a of the pin 43 and side 45a of groove 45 are provided with a 2° taper and the threads 42 by which it may be advanced or retracted into the bore 11 are of the order of 20 to the inch. Accordingly, it will be seen that the axial displacement of the member 31 under the influence of the advancing or retracting of the pin 43 can be extremely accurately controlled. The eccentricity between the axes of the pin 43 and the bushing 38 provides for a much more rapid axial displacement of the stop member 31 within the bore 11 and provides the coarse adjustment.

The invention has been described in the specification in one of its preferred forms and this is intended to be illustrative of the invention and not to be construed in a limiting manner, the scope of the invention being defined in the appended claims.

What I claim as my invention is:

1. In an hydraulic valve including a body having a cylindrical bore, a valve spool in the bore and slidable axially of the bore, means urging the valve spool against a stop adjustable axially of the bore, the stop comprising a cylindrical member slidably mounted in the bore and having an edge remote from the means urging the valve spool, a drilling in the wall of the body, a pin in the drilling having an inner end protruding into the bore of the body, the side surface of the pin lying adjacent the said edge of the cylindrical member, the side surface of the pin and the said edge of the cylindrical member being tapered, the pin being adapted to be advanced or retracted in the hole and means associated with the pin to enable it to be moved bodily axially of the bore.

2. In an hydraulic valve including a body having a cylindrical bore, a valve spool in the bore and slidable axially of the bore, means urging the valve spool against a stop adjustable axially of the bore, the stop comprising a cylindrical member slidably mounted in the bore and having an edge remote from the means urging the valve spool, a drilling in the wall of the body, a bushing in the drilling and rotatable about its longitudinal axis therein, a hole in the bushing having a longitudinal axis parallel to but spaced from the axis of the bushing, a pin in the hole in the bushing and adapted to be advanced or retracted in the hole, the inner end of the pin being disposed in the bore in the body and having a side surface abutting the said edge of the cylindrical member, the side surface of the pin and the said edge of the cylindrical member being tapered, and handle means carried by the bushing to enable it to be rotated in the drilling to move the pin bodily axially of the bore.

3. In an hydraulic valve including a body having a cylindrical bore, a valve spool in the bore and slidable axially of the bore, means urging the valve spool against a stop adjustable axially of the bore, the stop comprising a cylindrical member slidably mounted in the bore and having an annular groove cut in its external surface, a drilling in the wall of the body aligned with the groove radially of the body, a bushing in the drilling and rotatable about its longitudinal axis therein, a hole in the bushing having a longitudinal axis parallel to but spaced from the axis of the bushing, a pin in the hole in the bushing and adapted to be advanced or retracted in the hole, the inner end of the pin being disposed in the annular groove in the cylindrical member and abutting that edge of the annular groove in the cylindrical member adjacent the means urging the spool against the stop, said end of the pin being tapered, and handle means carried by the bushing to enable it to be rotated in the drilling to move the pin bodily axially of the bore.

4. In an hydraulic valve including a body having a cylindrical bore closed at at least one end, a valve spool in the bore and slidable axially of the bore, a compression spring urging the spool away from the closed end against a stop adjustable axially of the bore, the stop comprising a cylindrical member slidably mounted in the bore and having an annular groove cut in its external surface, the groove having sides normal to the axis of the bore, a drilling in the wall of the body aligned with the groove radially of the body, a bushing in the drilling and rotatable about its longitudinal axis, a threaded hole in the bushing having a longitudinal axis parallel to but spaced from the axis of the bushing, a pin threadably engaged in the threaded hole in the bushing and adapted to be advanced or retracted in the threaded hole by rotation relative to the bushing, the radially inner end of the pin being disposed in the annular groove and abutting that edge of the annular groove in the cylindrical member adjacent the compression spring, said end of the pin and the adjacent edge of the annular groove being tapered and handle means carried by the bushing to enable it to be rotated in the drilling to move the pin bodily axially of the bore.

References Cited in the file of this patent
UNITED STATES PATENTS

| | | |
|---|---|---|
| 1,997,890 | Wall | Apr. 16, 1935 |
| 2,016,839 | Schoenberger | Oct. 8, 1935 |
| 2,642,083 | Strong | June 16, 1953 |